A. L. RAMSEY.
VEHICLE AXLE SPINDLE LUBRICATOR.
APPLICATION FILED FEB. 23, 1911.
1,024,146.
Patented Apr. 23, 1912.
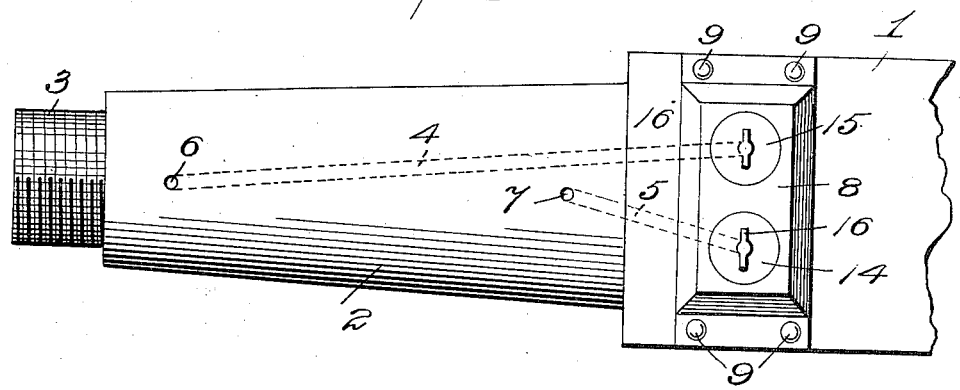
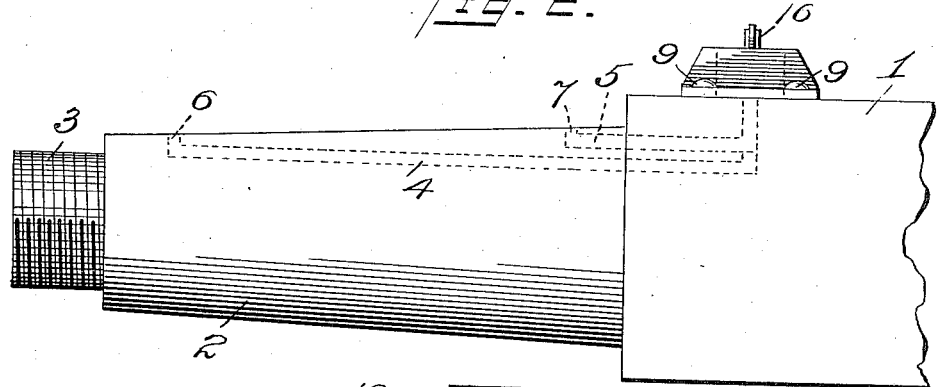
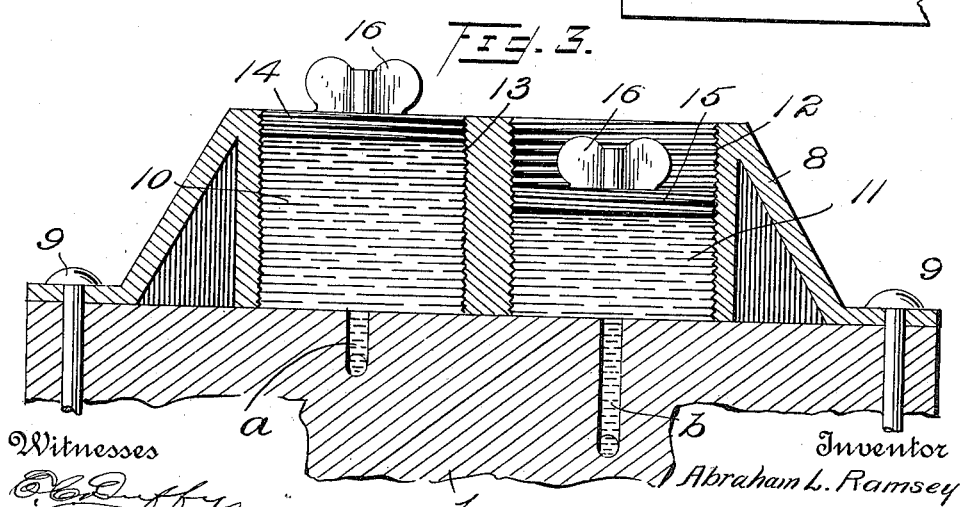
Witnesses
Inventor
Abraham L. Ramsey
Attorney

UNITED STATES PATENT OFFICE.

ABRAHAM L. RAMSEY, OF VINCENNES, INDIANA.

VEHICLE AXLE-SPINDLE LUBRICATOR.

1,024,146.  Specification of Letters Patent.  Patented Apr. 23, 1912.

Application filed February 23, 1911. Serial No. 610,250.

*To all whom it may concern:*

Be it known that I, ABRAHAM L. RAMSEY, a citizen of the United States, residing at Vincennes, in the county of Knox and State of Indiana, have invented certain new and useful Improvements in Vehicle Axle-Spindle Lubricators, of which the following is a specification.

This invention relates to vehicle axle spindle lubricators and one of the principal objects of the invention is to provide simple, reliable, efficient means for forcing axle grease to the surface of the axle spindle without requiring the removal of the wheel from the spindle.

Another object of this invention is to provide an axle spindle lubricator comprising a receptacle for axle grease or lubricant and threaded compression covers for said receptacle, by means of which said covers may be turned to discharge the lubricant from the receptacle through grooves or ducts in the spindle, so that the lubricant can be forced to the bearing surface of the spindle for lubricating the wheel without removing the latter from the spindle.

These and other objects may be attained by means of the construction illustrated in the accompanying drawing, in which:—

Figure 1 is a top plan view of a spindle lubricating device made in accordance with my invention; Fig. 2 is a side elevation of the same; Fig. 3 is a vertical sectional view taken through the lubricant receptacle and showing one of the covers depressed for forcing the lubricant to the spindle.

Referring to the drawing, the numeral 1 designates an axle which may be of the usual or any suitable construction, and 2 is the axle spindle provided with a threaded end 3 for a cap nut designed to hold the wheel on the spindle. Lubricant ducts 4 and 5 extend through the spindle 2, said duct 4 having an opening 6 leading to the surface of the spindle while the duct 5 is provided with an opening 7 which leads to the surface of the spindle, said openings 6 and 7 being located at or near the opposite ends of said spindle.

Secured to the axle 1 at a slight distance from the spindle 2 is a grease receptacle 8, said receptacle being secured to the axle by means of suitable screws or bolts 9. The receptacle 8 is provided with two separated compartments 10 and 11 said compartments being of circular form and provided with internal screw threads 12 and 13. Fitted to the screw threads 12 and 13 are threaded covers or pressers 14 and 15 provided with turn buttons 16, by means of which the pressers can be turned in the threads 12 and 13 to force the grease through the ducts $a$ and $b$ out through the openings 6 and 7 upon the surface of the spindle 2. From the foregoing it will be obvious that the spindle 2 may be lubricated near the opposite ends thereof by means of the threaded presser covers 14 and 15 which may be turned within the receptacle to force the grease or lubricant through the openings 6 and 7 whenever desired without removing the wheel from the spindle.

My invention is of simple construction, is located in a position entirely out of the way, and can be instantly used for lubricating the spindles of the axle whenever desired without removing the wheel from the spindle.

I claim:—

A lubricator for axle spindles comprising an axle having a spindle provided with separate lubricating ducts near the upper surface of said spindle, one of said ducts leading to an opening near the outer end of the spindle, and the other to an opening near the inner end of the spindle, said ducts diverging near their inner ends, said ducts having openings at their inner ends, said openings leading to the upper surface of the axle near the inner end of the spindle, a rectangular receptacle mounted on the axle above the last mentioned openings, said receptacle having circular screw threaded bores, said bores being concentric with the last mentioned openings, and communicating directly with them, and screw threaded presser covers fitted in said bores to move from top to bottom thereof, said presser covers each having a turn button on the upper side thereof.

In testimony whereof I affix my signature in presence of two witnesses.

ABRAHAM L. RAMSEY.

Witnesses:
 CLAUD RUL,
 LIZZIE WELTON.

Copies of this patent may be obtained for five cents each, by addressing the "Commissioner of Patents, Washington, D. C."